3,492,876
ALIQUANT DISCHARGE DEVICE
Brian S. Bull, London, England, Thomas F. Dutcher, Bethesda, Md., and Ole Siggaard-Andersen, Copenhagen, Denmark, assignors to the United States of America as represented by the Secretary of the Department of Health, Education, and Welfare
Filed Feb. 8, 1968, Ser. No. 704,065
Int. Cl. G01n 1/14
U.S. Cl. 73—425.6     7 Claims

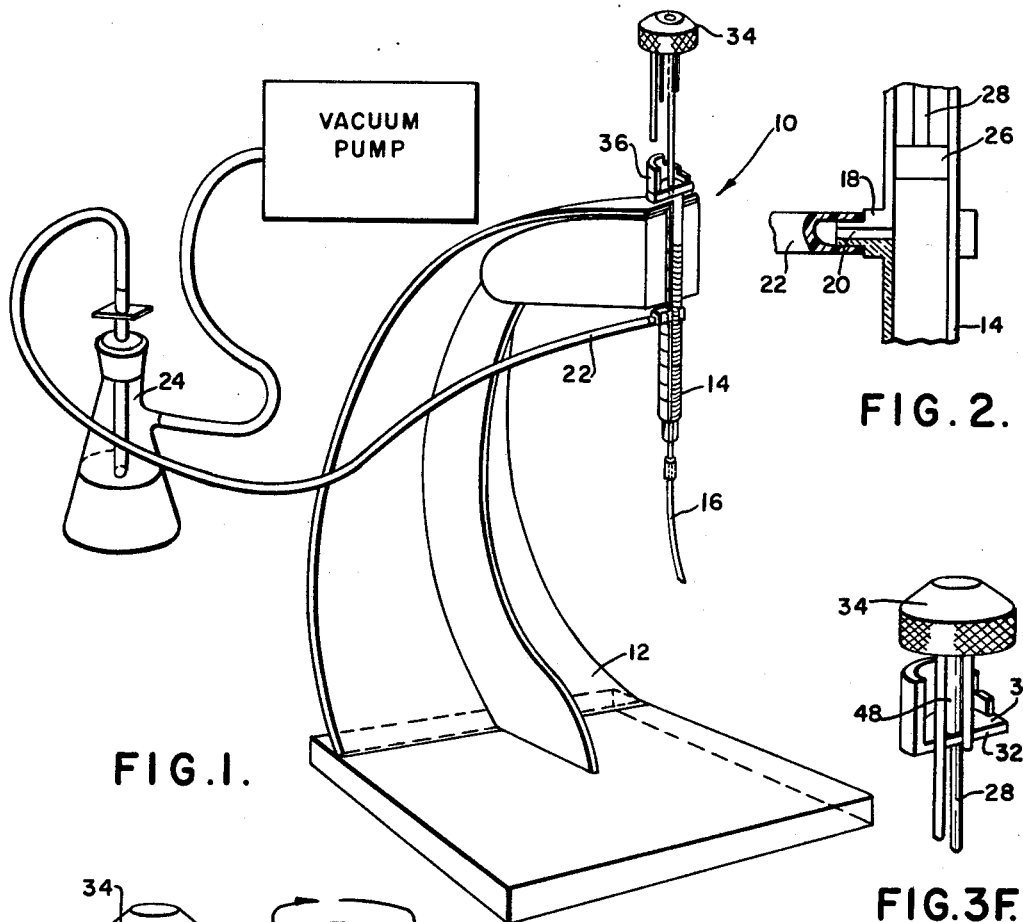
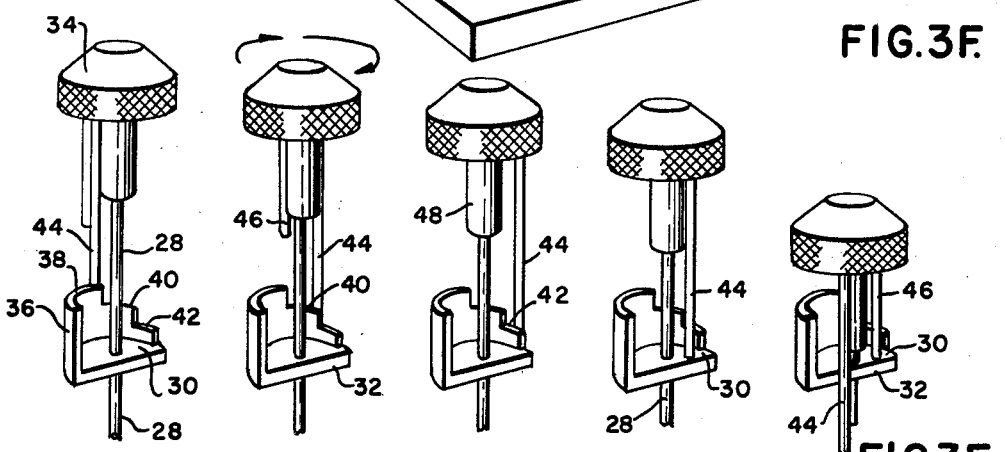
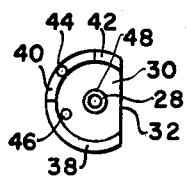

ABSTRACT OF THE DISCLOSURE

The discharge device relates to a glass syringe with a Teflon plunger piston and a side arm in the upper section of the syringe barrel. In use the plunger piston is withdrawn beyond the side arm and suction draws up a blood sample into the syringe. The plunger is then depressed cutting off the vacuum and trapping a known amount of blood in the syringe barrel. This specimen of blood is then aliquoted by means of metal stops affixed to the plunger at one end and abutting on a series of steps at the other. In this manner appropriate samples for platelet counts, reticulocyte counts, hematocrit determinations, differential counts, hemoglobin determinations and white cell counts can all be obtained from the sample specimen of blood. In the case of the cell count the appropriate dilutions are made by simply dispensing the sample of blood into a measured amount of diluent.

---

The present invention relates to an aliquant discharge device and, more particularly, to a pipetting and aliquant discharge diluting device for haematology tests.

During testing procedures it often occurs that a given quantity of material must be repeatedly used. For example, pipettes are often provided in standard sizes and a single pipette of a given single capacity is often repeatedly used to transfer a material to be treated or a reagent from one location to another. The need, therefore, exists for a device which is capable of rapidly and simply discharging a reagent or material to be tested in aliquot or aliquant charges of given and predetermined quantity from a single larger charge.

The problem is particularly acute with respect to the testing of blood since there are a number of different testing procedures which are normally required for a complete blood analysis. To separately take blood samples and separately discharge such samples from a pipette or other simple measuring device, as is conventionally done, is very wasteful of time and effort. For the different blood testing procedures, different quantities of blood may be needed and in some procedures the blood is diluted and in others it is not. In any event, it is necessary to precisely measure the quantity of blood used in each testing procedure.

Attempts have been made to at least partially mechanize the measured discharge of reagents and/or samples. Certain exemplary efforts in this regard are shown by the patents to Dovas No. 2,697,945; Hicks No. 2,091,404; Brown et al. No. 2,771,217; King et al. No. 3,119,524; Nerenberg No. 3,184,122 and Baruch et al. No. 3,192,-969. Such devices have not entirely solved the problems in the art and it has been desirable to obtain a device which is more convenient and simpler to operate.

Accordingly, it is an object of the present invention to overcome the deficiencies of the prior art, such as indicated above.

It is another object of the present invention to obtain a single large charge of a liquid sample or reagent and to then discharge a plurality of samples of predetermined quantity from the large single charge.

It is another object of the present invention to provide a pipetting and aliquant discharge device which is faster, more convenient and simpler to operate than devices of the prior art.

It is another object of the present invention to provide a vacuum type pipetting and aliquanter device for haematology tests which is faster, more convenient and simpler to operate than previously known devices.

These and other objects and the nature and advantages of the persent invention will be more apparent from the following detailed description taken in conjunction with the drawings wherein:

FIG. 1 is a perspective and partly schematic illustration of a single embodiment of a pipetting and aliquant discharge device in accordance with the present invention;

FIG. 2 is a sectional view of a portion of the device of FIG. 1;

FIGS. 3A–3F are partial perspective views of the embodiment of FIG. 1 showing various positions of the control portion of the device during sequential discharge of aliquant portions in predetermined quantities; and FIG. 4 is a plan, sectional view taken through a portion of the device.

A pipetting and aliquant discharge device in accordance with the present invention is shown generally at 10 in FIG. 1. In the embodiment illustrated, the device 10 is shown clamped vertically in a suitable support stand 12.

The device 10 comprises in general a cylindrical syringe barrel 14, preferably graduated as shown, and having a suitable inlet and discharge opening at the bottom thereof to which is attached a syringe needle 16. Along the side of the syringe barrel 14 and near the upper portion thereof is a side arm 18 having an opening 20 therein to which is attached a suitable suction tube 22 for operative connection to a vacuum pump in a known manner, such as through an intermediate flask 24 partially filled with water. Suction from the vacuum pump applied through the tube 22 and the opening 20 in the side arm 18 is used to pipette or draw up a suitable sample through the syringe needle 16 and into the barrel 14. In accordance with conventional practice, the syringe 14 may be formed of glass or a suitable plastic material.

Disposed in the upper portion of the barrel 14 is a plunger piston 26 which is in sealing relationship with the inner surface of the barrel 14; in the illustrated embodiment both the barrel 14 and the piston 226 are cylindrical. Connected to the top of the piston 26, rigidly in the illustrated embodiment, but rotationally if desired, is a piston rod 28. The plunger 26 is preferably formed of polytetrafluoroethylene (Teflon) or any suitable inert material which is capable of forming a relatively tight seal against the inner surfaces of the barrel 14 without binding therewith.

Lying above the barrel 14, and preferably sealing the top of the barrel closed, is a guide plate 30 which is preferably semi-circular as illustrated. The guide plate 30 serves to guide the piston rod 28 as it slides vertically through a vertical hole provided therein and prevents any sideward movement of such piston rod 28. In the embodiment shown, the guide plate 30 has one flat side 32 which is relatively close to the axis of the barrel 14 (as best shown in FIG. 4) compared to the semicircular side. The guide plate 30 is provided with an opening through which the piston rod 28 passes upwardly.

A suitable hand control, such as a knurled knob 34, is provided in the illustrated embodiment at the free upper end of the piston rod 28. The knurled knob 34 is susceptible to rotation as shown by the arrow in FIG. 3B, either by rotation of the piston 26 within the cylindrical barrel 14 as is preferred; or particularly when the barrel and piston are not cylindrical by way of a pivoted connection between the piston rod 28 and the piston 26, or by way of a pivoted connection between the piston rod 28 and the knurled knob 34. The purpose of this rotation is to permit a step-wise depression of the plunger for aliquant discharge of samples from the barrel 14 in a manner which will be more apparent from the structure described below.

Projecting upwardly from the guide plate 30 is a semicircular element 36 which comprises a series of steps 38, 40 and 42. The number of steps may vary depending on the design of the device and its intended function, but in the illustrated embodiment three steps are provided, the upper surface of the guide plate 30 acting as a fourth step. The guide plate 30 and the upwardly projecting semi-circular element 36 may be formed of a unitary piece of material, or they may be connected separate elements; and they may be formed of any suitable material such as die-cast metal, injection molded plastic, or the elements may be machined or fabricated in any suitable manner.

Connected for axial and rotary movement with the knurled knob 34 are suitable means for sequentially mating with the steps 38, 40, 42 (and 30). Such mating means may be connected to the piston rod 28, itself, if such piston rod 28 is capable of rotation with the knurled knob 34; but preferably such mating means are connected to the knurled knob and project downwardly even though the piston rod 28 be capable of rotation about its axis. Thus, in the illustrated embodiment, such mating means comprise a series of downwardly projecting rods 44, 46 and 48 which move both axially and rotationally with both the knurled knob 34 and the piston rod 28. It is seen from the FIG. 3 series that the downwardly projecting rod 44 is of greatest length, the rod 48 is of shortest length, and the rod 46 of a length intermediate to that of the rods 44 and 48. Also, in the illustrated embodiment the rod 48 is shown as being coaxial with the piston rod 28, although it will be quite clear that such rod 48 could be placed immediately adjacent such piston rod 28.

Noting FIG. 4, it is seen that in the illustrated embodiment the downwardly projecting rods 44, 46 and 48 are spaced from the piston rod 28 at different radial distances. The longest rod 44 is placed at a radius so that it will lie directly above the semi-circular stepped element 36. The rods 46 and 48, on the other hand, do not directly overlie such semi-circular element 36.

It is believed that the functioning of the device will be apparent from the foregoing structural description. However, for better understanding the operation of the device will be described below for a specific embodiment designed for the aliquoting of blood specimens for testing purposes, it being understood that devices of the general character described may be used for a variety of pipetting and discharging functions.

Directly beneath the device 10 and in contact with the needle 16 there is provided a supply of blood in a suitable container. The vacuum pump is turned on and the knurled knob 34 is pulled upwardly so that the plunger 26 is in the position shown in FIG. 2. The side arm 18 being open to the vacuum pump, suction draws up a blood sample into the syringe barrel 14. At this point the plunger is depressed, the piston 26 moving past the side arm opening 20 thereby cutting off the vacuum and providing a known amount of blood in the syringe barrel 14.

For a platelet count, the volume of blood in the syringe is discharged into a length of small bore polyvinyl chloride tubing termed a "platelet sedimentation tube." The syringe is then refilled with blood as above described.

This specimen of blood in the barrel 14 is then aliquoted as shown in the FIG. 3 series as follows:

For a reticulocyte count a measured amount of stain solution in a container is placed beneath the needle 16, the knurled knob 34 is rotated so that the rod 44 overlies the step 38, and the knob 34 is then depressed until the rod 44 strikes the step 38 as shown in FIG. 3A thereby causing discharge of a given amount of blood into the measured staining solution.

For hematocrit determinations, the knurled knob 34 is then rotated so that the rod 44 overlies the step 40 as shown in FIG. 4. The plunger knob is then depressed to the position shown in FIG. 3B thereby discharging another given quantity of blood for such hematocrit determinations by the downward movement of the piston 26.

For differential counts, the knob 34 is again rotated so that the rod 44 overlies the step 42 and the plunger is again depressed to the position shown in FIG. 3C thereby causing another measured quantity of blood to flow onto a glass slide for smearing.

For hemoglobin determinations the knurled knob 34 is again rotated so that the long rod 44 overlies the plate 30. The plunger is again depressed to the position shown in FIG. 3D causing a fourth measured quantity of blood to be discharged into a suitable diluent.

For the white blood cell count the knurled knob is again rotated so that the long rod 44 clears the edge 32 of the plate 30 but so that the intermediate length rod 46 lies above the guide plate 30. The plunger is again depressed to the position shown in FIG. 3E, thereby discharging into a suitable diluent the fifth measured charge of blood.

A sixth quantity may be discharged by again rotating the knurled knob 34 so that the intermediate length rod 46 clears the edge 32 of the guide plate 30, and then depressing the plunger to the position shown in FIG. 3F so that the shortest rod 48 contacts the upper surface of the guide plate 30.

The device according to the present invention is extremely convenient and is very simple to operate. It greatly simplifies and increases the speed of measuring given charges of blood for various testing purposes.

It will be understood that in place of a three step semicircular element 36, even more steps may be provided and the shorter rods 46 and 48 may be eliminated; or more steps may be added without eliminating the shorter rods 46 and 48 if more than six portions are desired to be dispensed. The height of the steps may vary in a predetermined manner to provide the desired quantity of discharge at each step.

What is claimed is:

1. A pipetting and aliquant discharge device comprising:
   a syringe barrel for containing a liquid sample charge, said barrel defining an inlet and discharge opening at the bottom thereof;
   suctions means to pipette the liquid sample charge into said barrel through the opening;
   and means to discharge aliquot samples from the charge within said barrel through the discharge opening, said discharge means comprising a piston within said barrel and in sealing relationship with the inner sides thereof, a guide plate at the upper end of said barrel defining a hole therethrough, a piston rod connected to said piston and passing through said hole in said guide plate, a plunger knob at the upper end of said piston rod, a series of semicircular steps projecting upwardly from said guide plate, and means connected for movement with said plunger knob to sequentially mate with said semicircular steps as said knob is rotated to effect the stepwise depression of said knob and piston and the consequent aliquant discharge of samples from said barrel.

2. A device in accordance with claim 1 wherein said means to pipette comprises a vacuum pump operatively connected to said barrel through an opening in the side of said barrel.

3. A device in accordance with claim 1 wherein said mating means connected for movement with said knob comprises means projecting downwardly from beneath said plunger knob.

4. A device in accordance with claim 3 wherein said guide plate is generally semicircular and said means projecting downwardly from said knob comprises a first rod for contacting each of said steps and said guide plate in sequence as said knob is rotated and depressed, a second rod of shorter length than said first rod for contacting said guide plate when said knob has been rotated so that said first rod clears said guide plate, and a third rod of shorter length than said second rod for contacting said guide plate when said knob had been rotated so that said second rod clears said guide plate.

5. A device in accordance with claim 4 wherein said third rod is coaxial with said piston rod.

6. A device in accordance with claim 5 wherein said series of semicircular steps consists of three steps above said guide plate.

7. A device in accordance with claim 1 wherein said barrel and piston are cylindrical and said piston rod is axial to said barrel and piston.

References Cited

UNITED STATES PATENTS

| 1,974,236 | 9/1934 | Cantacuzene | 73—425.6 |
| 2,607,343 | 8/1952 | Saryer. | |
| 3,316,647 | 5/1967 | Swallert | 128—276 |

FOREIGN PATENTS 365,912 12/1922 Germany.

HOUSTON S. BELL, JR., Primary Examiner

U.S. Cl. X.R.

141—27; 128—210; 222—309, 438; 23—259